(12) United States Patent
Ruiz

(10) Patent No.: US 10,219,653 B1
(45) Date of Patent: Mar. 5, 2019

(54) FOLDABLE AND PORTABLE GRILLING APPARATUS

(71) Applicant: Luis Alberto Ruiz, Miami Lakes, FL (US)

(72) Inventor: Luis Alberto Ruiz, Miami Lakes, FL (US)

( * ) Notice: Subject to any disclaimer, the term of this patent is extended or adjusted under 35 U.S.C. 154(b) by 413 days.

(21) Appl. No.: 15/000,349

(22) Filed: Jan. 19, 2016

Related U.S. Application Data

(60) Provisional application No. 62/105,326, filed on Jan. 20, 2015.

(51) Int. Cl.
*A47J 37/04* (2006.01)
*A47J 37/07* (2006.01)

(52) U.S. Cl.
CPC .... *A47J 37/0763* (2013.01); *A47J 2037/0777* (2013.01)

(58) Field of Classification Search
CPC ............... A47J 37/0763; A47J 2037/0777
USPC ............ 126/25 R, 9 R, 29, 30, 9 A, 9 B, 11, 126/37 R, 37 A, 37 B; 99/400, 401, 446, 99/448, 449
See application file for complete search history.

(56) References Cited

U.S. PATENT DOCUMENTS

| | | | | |
|---|---|---|---|---|
| 1,198,524 A | * | 9/1916 | Cunliffe | B65D 7/26 |
| | | | | 119/499 |
| 1,212,162 A | * | 1/1917 | Green | A47J 37/0763 |
| | | | | 126/30 |
| 1,238,142 A | * | 8/1917 | Hitchcock | F24B 1/205 |
| | | | | 126/29 |
| 2,061,336 A | * | 11/1936 | Stuart | F24B 1/205 |
| | | | | 126/25 R |
| 2,244,935 A | * | 6/1941 | Binger | F24C 1/16 |
| | | | | 126/9 R |
| 2,473,458 A | * | 6/1949 | Walker | F24B 1/202 |
| | | | | 126/25 R |
| 2,473,569 A | * | 6/1949 | Cast | F24B 1/205 |
| | | | | 126/154 |
| 2,511,515 A | * | 6/1950 | Schmitt | F24B 1/205 |
| | | | | 126/25 R |
| 2,515,521 A | * | 7/1950 | Loffredo | F24B 1/205 |
| | | | | 126/304 A |
| 2,573,772 A | * | 11/1951 | Nysten | A23B 4/052 |
| | | | | 126/29 |

(Continued)

OTHER PUBLICATIONS

America's Product LLC, "Portable Pit and Grill" http://www.americasproduct.com/index.html, Medley, Florida, © Copyright, 2011.

*Primary Examiner* — Jimmy Chou
(74) *Attorney, Agent, or Firm* — Ruben Alcoba, Esq.

(57) ABSTRACT

A foldable and portable grilling unit includes a body and a plurality of upright corner leg members which together support the body spaced above a support surface. The body has front and back walls and opposite side walls extending between them so as to form a grilling chamber when the body is in an erected operational configuration. The side walls each are formed by a pair of panels, inner hinged connections between the panels of each pair, and outer hinged connections of the panels of each pair to the front and back walls. The panels of each side wall may be folded to convert the body to a compacted portable configuration in which it may be transported in a container sleeve by a user.

13 Claims, 9 Drawing Sheets

(56) References Cited

U.S. PATENT DOCUMENTS

| | | | | |
|---|---|---|---|---|
| 2,576,750 A * | 11/1951 | Clark | A47B 43/02 | 126/9 R |
| 2,826,981 A | 1/1956 | Chick | | |
| 2,734,499 A * | 2/1956 | Lombardi | A47J 37/0718 | 126/25 R |
| 2,780,215 A * | 2/1957 | Vacanti, Jr. | F24B 1/205 | 126/25 A |
| 2,862,777 A * | 12/1958 | Paige | A47B 3/083 | 108/34 |
| 2,985,164 A * | 5/1961 | Imoto | F24B 1/205 | 126/25 R |
| 3,308,807 A * | 3/1967 | Little | A47J 37/0763 | 126/275 R |
| 3,343,527 A * | 9/1967 | Manteris | A47J 37/0718 | 126/163 R |
| 3,421,493 A * | 1/1969 | Miller | A47J 37/0763 | 126/25 R |
| 3,489,131 A * | 1/1970 | Richins | F24B 1/205 | 126/9 R |
| 3,611,912 A * | 10/1971 | Choc | A47J 37/0718 | 126/25 R |
| 3,688,757 A * | 9/1972 | Dusek | A47J 37/0763 | 126/25 A |
| 3,884,214 A * | 5/1975 | Duncan | A47J 37/079 | 126/25 B |
| 3,989,028 A * | 11/1976 | Berger | A47J 37/0682 | 126/25 R |
| 3,999,472 A * | 12/1976 | Einto | A47J 37/0731 | 126/25 R |
| 4,442,762 A | 4/1984 | Beller | | |
| 4,455,991 A * | 6/1984 | Su | A47J 37/0763 | 126/25 R |
| 4,455,992 A * | 6/1984 | Hsiao | F24B 1/205 | 126/9 R |
| 4,457,290 A * | 7/1984 | Edwards | A47J 37/0704 | 126/9 R |
| 4,526,158 A * | 7/1985 | Lee | A47J 37/0763 | 126/25 A |
| 4,530,343 A * | 7/1985 | Beck | A47J 37/0768 | 126/9 R |
| 4,531,505 A * | 7/1985 | Hait | F24C 1/16 | 126/25 R |
| 4,624,238 A * | 11/1986 | Hait | F24B 1/205 | 126/25 R |
| 4,714,013 A * | 12/1987 | Telfer | F24C 1/16 | 126/9 R |
| 4,749,303 A * | 6/1988 | Keizer | E01C 23/14 | 126/271.2 A |
| 4,794,906 A * | 1/1989 | Longley, Jr. | F24C 1/16 | 126/38 |
| 4,878,476 A * | 11/1989 | Oliphant | A47J 37/0763 | 126/25 R |
| 4,884,551 A * | 12/1989 | Hait | F24C 1/16 | 126/25 R |
| 4,944,282 A | 7/1990 | Aguiar et al. | | |
| 5,241,948 A * | 9/1993 | Thibodeau | F24C 15/08 | 126/25 R |
| 5,243,961 A | 9/1993 | Harris | | |
| 5,293,859 A * | 3/1994 | Lisker | A47J 37/0768 | 126/25 A |
| 5,333,540 A * | 8/1994 | Mazzocchi | A47J 37/0763 | 126/25 R |
| 5,517,903 A * | 5/1996 | Kaufman | A47J 27/10 | 126/39 B |
| 5,588,355 A | 12/1996 | Mead et al. | | |
| 5,713,344 A * | 2/1998 | Gilbert | A47J 37/0772 | 126/25 R |
| 5,785,046 A * | 7/1998 | Colla | F24B 1/202 | 126/9 R |
| 5,970,971 A * | 10/1999 | Wu | A47J 37/0763 | 126/25 R |
| 6,038,965 A * | 3/2000 | Thorndyke | A47J 37/0682 | 126/25 R |
| 6,182,560 B1 * | 2/2001 | Andress | A47J 37/0718 | 126/25 R |
| 6,425,387 B1 * | 7/2002 | Rohback, Jr. | F24B 1/205 | 126/152 A |
| 6,672,303 B1 * | 1/2004 | Emter | A47J 37/0713 | 126/38 |
| 6,708,604 B1 | 3/2004 | Deichler, Jr. | | |
| 6,935,326 B1 | 8/2005 | Willis | | |
| 6,945,243 B1 * | 9/2005 | Walker | A47J 37/0623 | 126/9 R |
| 6,973,927 B1 * | 12/2005 | Stewart | A47J 37/0786 | 126/201 |
| 7,051,649 B2 * | 5/2006 | Lin | A47J 37/0704 | 126/9 B |
| 7,849,848 B2 * | 12/2010 | Catalina | F24B 3/00 | 126/25 R |
| 7,856,924 B1 | 12/2010 | Stihi | | |
| 7,878,034 B2 * | 2/2011 | Alber | E05C 7/06 | 292/142 |
| 8,028,689 B2 * | 10/2011 | Bruno | A47J 37/079 | 126/25 B |
| 8,171,926 B2 * | 5/2012 | Chang | A47J 37/079 | 126/152 A |
| 8,342,461 B2 * | 1/2013 | Sutphen | B65F 1/06 | 220/212 |
| 8,490,614 B1 * | 7/2013 | Gregory | A47J 37/0754 | 126/1 R |
| 8,544,459 B2 * | 10/2013 | Rees, Jr. | A47J 37/0786 | 126/25 A |
| 8,656,903 B1 | 2/2014 | Branton et al. | | |
| 8,770,184 B2 * | 7/2014 | Schneider | A47J 33/00 | 126/241 |
| 9,420,913 B2 * | 8/2016 | DeSpain | F24C 1/16 | |
| 9,702,563 B2 * | 7/2017 | Probst | F24C 1/16 | |
| 9,714,113 B2 * | 7/2017 | Jung | B65D 15/00 | |
| 2001/0029940 A1 * | 10/2001 | Patience | A47J 37/0763 | 126/9 B |
| 2003/0234014 A1 * | 12/2003 | Fitzgerald | A47J 33/00 | 126/25 R |
| 2004/0020483 A1 * | 2/2004 | Chen | F24B 1/022 | 126/9 R |
| 2005/0115556 A1 * | 6/2005 | Carson | A47J 37/0786 | 126/25 R |
| 2005/0279341 A1 * | 12/2005 | Chung | A47J 37/0704 | 126/9 R |
| 2006/0076003 A1 * | 4/2006 | Smolinsky | A47J 37/067 | 126/9 R |
| 2006/0102163 A1 * | 5/2006 | Sanders | A47J 33/00 | 126/30 |
| 2007/0006863 A1 * | 1/2007 | Barbarich | A47J 37/0763 | 126/9 R |
| 2008/0078377 A1 * | 4/2008 | Gardner | F24B 1/192 | 126/548 |
| 2008/0230043 A1 * | 9/2008 | Bruno | A47J 37/079 | 126/25 B |
| 2008/0276926 A1 * | 11/2008 | Chang | A47J 37/079 | 126/25 R |
| 2009/0020109 A1 * | 1/2009 | Rheault | A47J 33/00 | 126/25 R |
| 2009/0038605 A1 * | 2/2009 | Dahle | A47J 37/0704 | 126/25 R |
| 2009/0165771 A1 * | 7/2009 | Selk | A47J 37/0781 | 126/25 R |
| 2009/0314277 A1 * | 12/2009 | Marsh | F24C 1/16 | 126/304 R |
| 2010/0218756 A1 * | 9/2010 | Erez | E04H 4/08 | 126/566 |
| 2010/0300425 A1 * | 12/2010 | Rees, Jr. | A47J 37/0763 | 126/25 R |
| 2012/0125323 A1 * | 5/2012 | Goeken | A47J 37/0704 | 126/9 R |
| 2012/0318255 A1 * | 12/2012 | Brown | F23B 20/00 | 126/25 R |

(56) References Cited

U.S. PATENT DOCUMENTS

| | | | | |
|---|---|---|---|---|
| 2013/0032131 A1* | 2/2013 | Horito | ............... | F24C 3/14 |
| | | | | 126/38 |
| 2013/0312737 A1* | 11/2013 | Chung | ............... | A47J 33/00 |
| | | | | 126/9 B |
| 2014/0069412 A1* | 3/2014 | Garman | ............... | A47J 37/0763 |
| | | | | 126/25 R |
| 2014/0326231 A1* | 11/2014 | Despain | ............... | A47J 33/00 |
| | | | | 126/59 |
| 2015/0289715 A1* | 10/2015 | Hartkorn | ............... | A47J 37/0713 |
| | | | | 126/59 |
| 2016/0166107 A1* | 6/2016 | Larson | ............... | A47J 37/0763 |
| | | | | 126/9 B |
| 2016/0195276 A1* | 7/2016 | Calvin | ............... | F24B 1/205 |
| | | | | 126/9 B |
| 2017/0234545 A1* | 8/2017 | Barford | ............... | F24B 1/205 |
| | | | | 126/29 |

* cited by examiner

FOLDABLE AND PORTABLE GRILLING APPARATUS

CROSS REFERENCE(S) TO RELATED APPLICATION(S)

This non-provisional U.S. patent application claims the benefit of U.S. Provisional Patent Application Ser. No. 62/105,326, filed Jan. 20, 2015, which is incorporated-by-reference herein in its entirety.

FIELD OF THE INVENTION

The present invention relates to a grilling apparatus capable of cooking whole animals or being used as a BBQ, and more particularly, is concerned with a foldable and portable grilling apparatus of this general category that is designed for handling by a single individual.

BACKGROUND OF THE INVENTION

There is a category of grilling apparatus that can be used as a whole animal, usually a pig, roaster as well as a conventional BBQ. Existing grilling apparatus in this category require at least two persons to carry the grilling apparatus during transport, set up the grilling apparatus for operation, and manage the grilling apparatus during operation, especially in the case of heavy components—either manual or electronic—that are typically provided to rotate the food being grilled.

Accordingly, there remains a need in the art for an innovation that will overcome the deficiencies of past approaches and the problems that remain unsolved.

SUMMARY OF THE INVENTION

The present invention is directed to an innovation that overcomes the deficiencies of the known art and the problems that remain unsolved. The innovation provides a foldable and portable grilling apparatus that utilizes a combination of lightweight components enabling ease of set up and operation as well as ease of converting to a compact size and transport by a single individual.

In one aspect of the present invention, a foldable grilling apparatus includes:
  a body including
    opposite front and back walls, and
    a pair of opposite side walls disposed between the opposite front and back walls,
    wherein each of the opposite side walls are convertible between unfolded and folded relationships such that a grilling chamber being open at a top and bottom is formed by the front and back walls and the opposite side walls only when each of the opposite side walls are in the unfolded relationship and such that at least one grilling grate is supportable in the grilling chamber;
  a plurality of upright corner leg members each mounted at one of a pair of opposite edge portions of a respective one of the front and back walls so as to support the body spaced above a support surface;
  a top lid movably connected to the body so as to enable the top lid to be moved between a closed position in which the top lid is disposed overlying the open top of the grilling chamber and an opened position in which the top lid is disposed away from the open top of the grilling chamber, thereby enabling converting the opposite side walls from the unfolded relationships to the folded relationships; and
  a tray movable supported by the upright corner leg members so as to enable the tray to be moved between a closed position in which the tray underlies the open bottom of the grilling chamber and an opened position in which the tray is removed from the open bottom of the grilling chamber, thereby enabling converting the opposite side walls from the unfolded relationships to the folded relationships.

In another aspect of the present invention, the grilling apparatus includes intake apertures defined through a lower end portion of each of the opposite side walls for enabling entry of air from exterior of the body into the grilling chamber. Also, the grilling apparatus includes exhaust apertures defined through an upper end portion of each of the opposite side walls for venting gaseous products of combustion from the grilling chamber.

In another aspect of the present invention, the grilling apparatus further includes upper and lower doors mounted on the front wall of the body and being movable for opening and closing access through upper and lower openings in the front wall to respective upper and lower areas in the grilling chamber of the body.

In another aspect of the present invention, the grilling apparatus further includes ledges on upper and lower inside portions of the front and back walls adapted to removably support upper and lower grilling grates in the grilling chamber of the body.

In another aspect of the present invention, a foldable and portable grilling apparatus includes:
  a body including
    opposite front and back walls, and
    a pair of opposite side walls disposed between the opposite front and back walls, each of the opposite side walls including
      a pair of panels,
      inner hinged connections of the panels of each pair to one another at adjacent inner end portions thereof, and
      outer hinged connections between remote outer edge portions of the panels of each pair and inner sides of opposite end portions of the front and back walls such that the pairs of the panels of the opposite side walls are convertible between unfolded and folded relationships,
    wherein a grilling chamber being open at a top and bottom is formed by the front and back walls and the pair of opposite side walls only when the panels of the opposite side walls are in the unfolded relationships and the body is thereby in an erected operational configuration;
  a plurality of upright corner leg members each mounted at one of a pair of opposite edge portions of a respective one of the front and back walls so as to support the body spaced above a support surface;
  a pair of elongated lock bars each pivotally mounted at an inner side of one of the pair of panels of respective ones of the opposite side walls for movement between locked and unlocked positions in which the lock bar respectively is overlapped with one of the inner hinged connections between each of the pair of panels so as to retain the panels in the unfolded relationship and is displaced from one of the inner hinged connections between each of the pair of panels so as to enable converting the panels to the folded relationship and thereby the body to a compacted portable configuration;

a grate assembly adapted to hold an object to be grilling in the grilling chamber, the grate assembly having a pair of opposite protrusions projecting in opposite directions beyond opposite sides of the grate assembly such that the protrusions are removably and rotatably mountable by respective ones of the lock bars when in the locked positions so as to support the grate assembly and enable rotating the grate assembly between upright and inverted positions in the grilling chamber;

a top lid movable between a closed position in which the top lid overlies the open top of the grilling chamber and an opened position in which the top lid is disposed away from the open top of the grilling chamber, thereby enabling converting the pair of panels of each of the opposite side walls from the unfolded relationships to the folded relationships and thereby the body to the compacted portable configuration; and a tray movably supported by the body so as to enable the tray to be moved between a closed position in which the tray underlies the open bottom of the grilling chamber and an opened position in which the tray is removed from the open bottom of the grilling chamber, thereby enabling converting the pair of panels of each of the opposite side walls from the unfolded relationship to the folded relationship and thereby the body to the compacted portable configuration.

In another aspect of the present invention, the grilling apparatus also includes a pair of pins insertable through respective apertures in the pair of panels of at least one of the opposite side walls so as to underlie and retain the grate assembly extending horizontally in either the upright or inverted positions in the grilling chamber. The grilling apparatus further includes latches mounted on respective pairs of front and back upright corner leg members being operable to retain the body in the compacted portable configuration.

In another aspect of the present invention, a foldable and portable grilling apparatus includes:

a body including
  opposite front and back walls, and
  a pair of opposite side walls disposed between the opposite front and back walls, each of the opposite side walls including
    a pair of panels,
    inner hinged connections of the panels of each pair to one another at adjacent inner edge portions thereof, and
    outer hinged connections between remote outer edge portions of the panels of each pair and opposite edge portions of the front and back walls such that the pairs of the panels of the opposite side walls are convertible between unfolded and folded relationships,
  wherein a grilling chamber being open at a top and bottom is formed by the front and back walls and the pair of opposite side walls only when the panels of the opposite side walls are in the unfolded relations and the body is thereby in an erected operational configuration;
a plurality of upright corner leg members each mounted at one of a pair of opposite edge portions of a respective one of the front and back walls so as to support the body spaced above a support surface;

a pair of elongated lock bars each pivotally mounted at an inner side of one of the pair of panels of respective ones of the opposite side walls for movement between locked and unlocked positions in which the lock bar respectively is overlapped with one of the inner hinged connections between each of the pair of panels so as to retain the panels in the unfolded relationship and is displaced from one of the inner hinged connections between each of the pair of panels so as to enable converting the panels to the folded relationship and thereby the body to a compacted portable configuration;

a top lid movably connected at a rear edge portion to a top edge portion of the back wall of the body so as to enable the top lid to be swung between a closed position in which the top lid overlies the open top of the grilling chamber and an opened position in which the top lid hangs adjacent to an exterior side of the back wall of the body, thereby enabling converting the pair of panels of each of the opposite side walls from the unfolded relationships to the folded relationships and thereby the body to the compacted portable configuration;

a tray movably supported by the body so as to enable the tray to be moved between a closed position in which said tray underlies the open bottom of the grilling chamber and an opened position in which the tray is removed from the open bottom of the grilling chamber and placed adjacent to the top lid at the exterior side of the back wall and attached to the back wall, thereby enabling converting the pair of panels of each of the opposite side walls from the unfolded relationships to the folded relationships and thereby the body to the compacted portable configuration; and latches mounted on respective pairs of the front and back upright corner leg members being operable to retain the body in the compacted portable configuration.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 5:
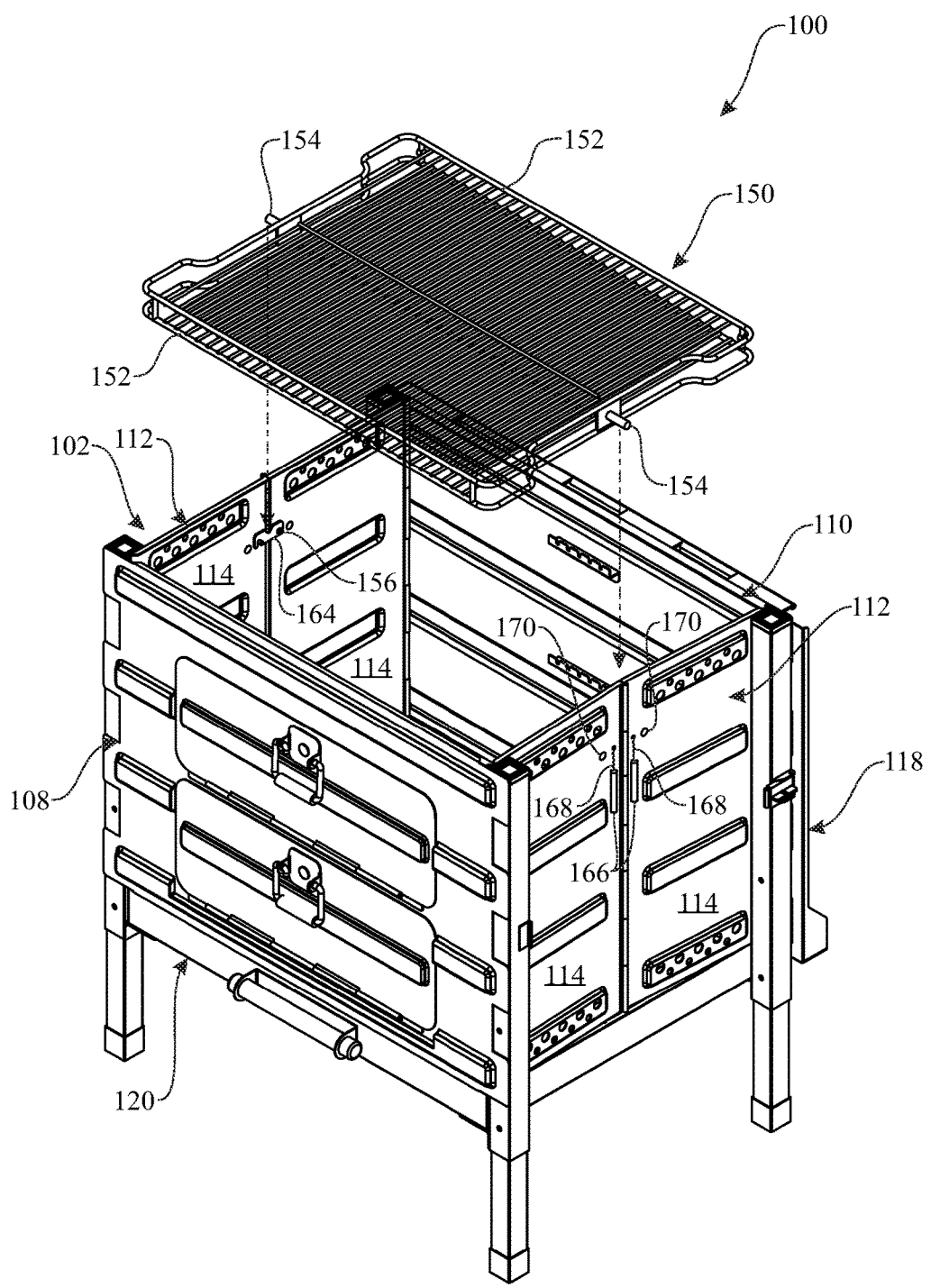
FIG. 5 presents a top front isometric view of the grilling apparatus originally introduced in FIG. 1, illustrating the lid in the fully open position with a pair of alternate sandwich grates for holding a pig for roasting, the sandwich grates being aligned with their mounting position in the grilling chamber of the apparatus.
Figure 6:
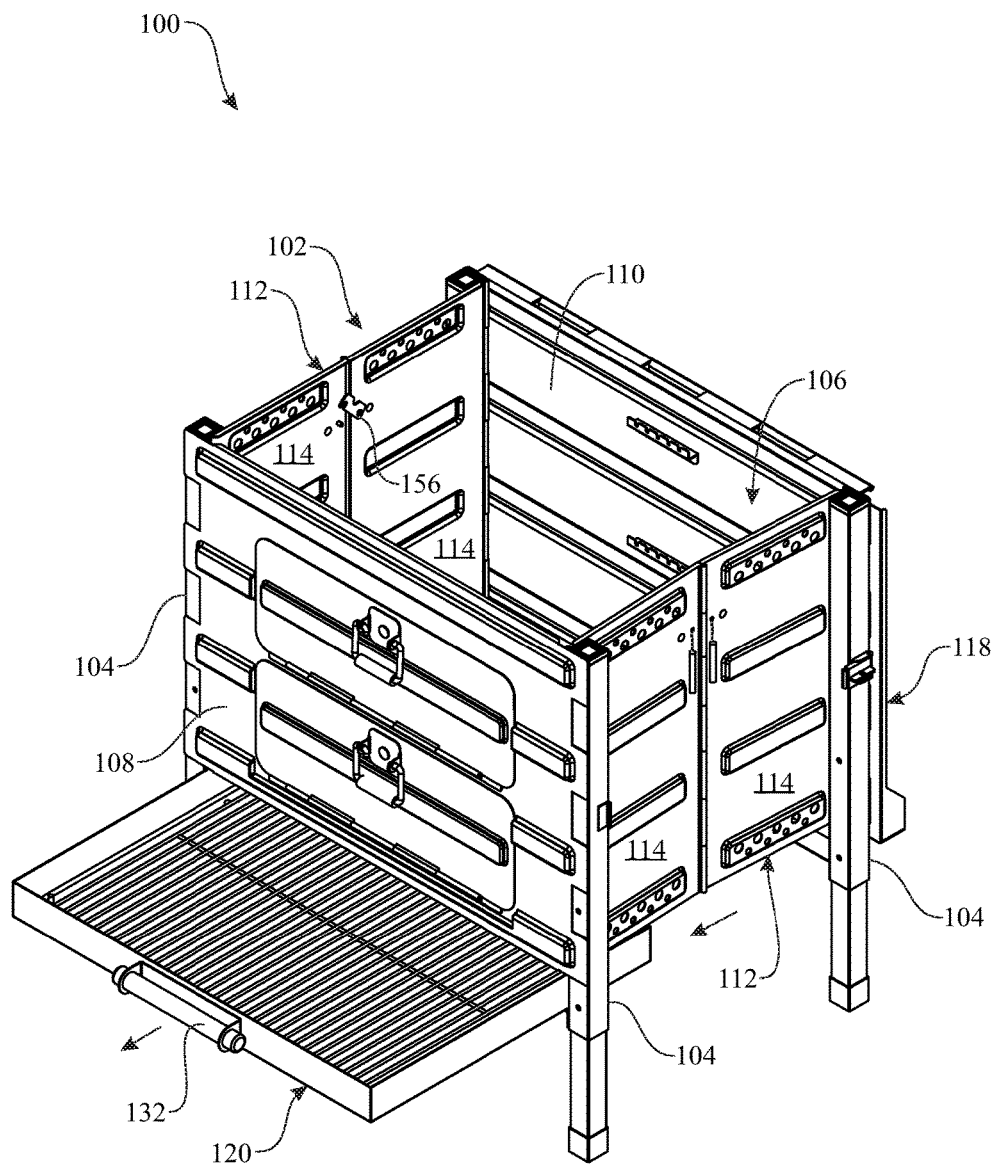
FIG. 6 presents a top front isometric view of the grilling apparatus illustrating the setup at the start of converting the grilling apparatus from an erected operational configuration to a compacted portable configuration.
Figure 7:
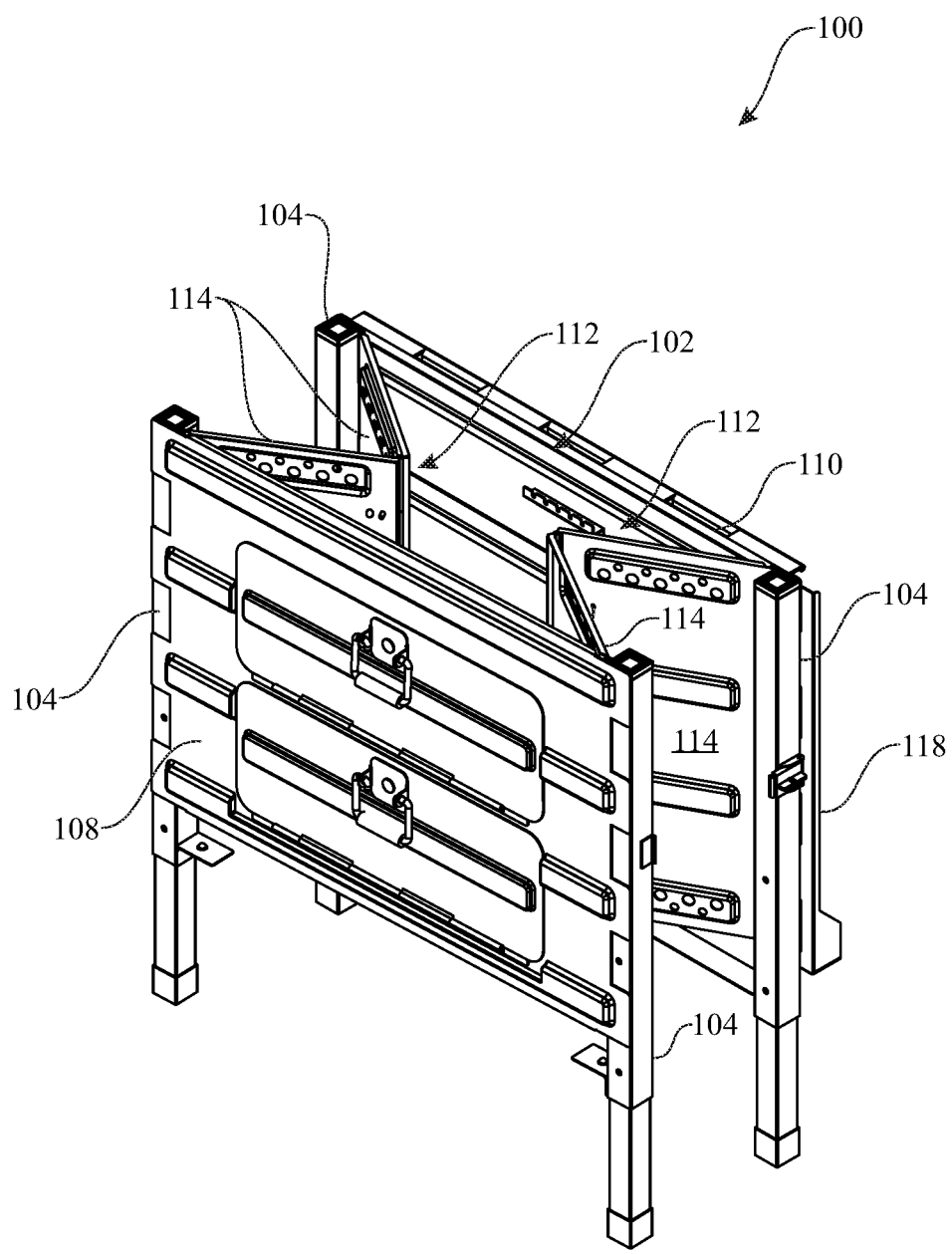
FIG. 7 presents a top front isometric view of the grilling apparatus illustrating the start of converting the apparatus from the erected operational configuration to the compacted portable configuration.
Figure 8:
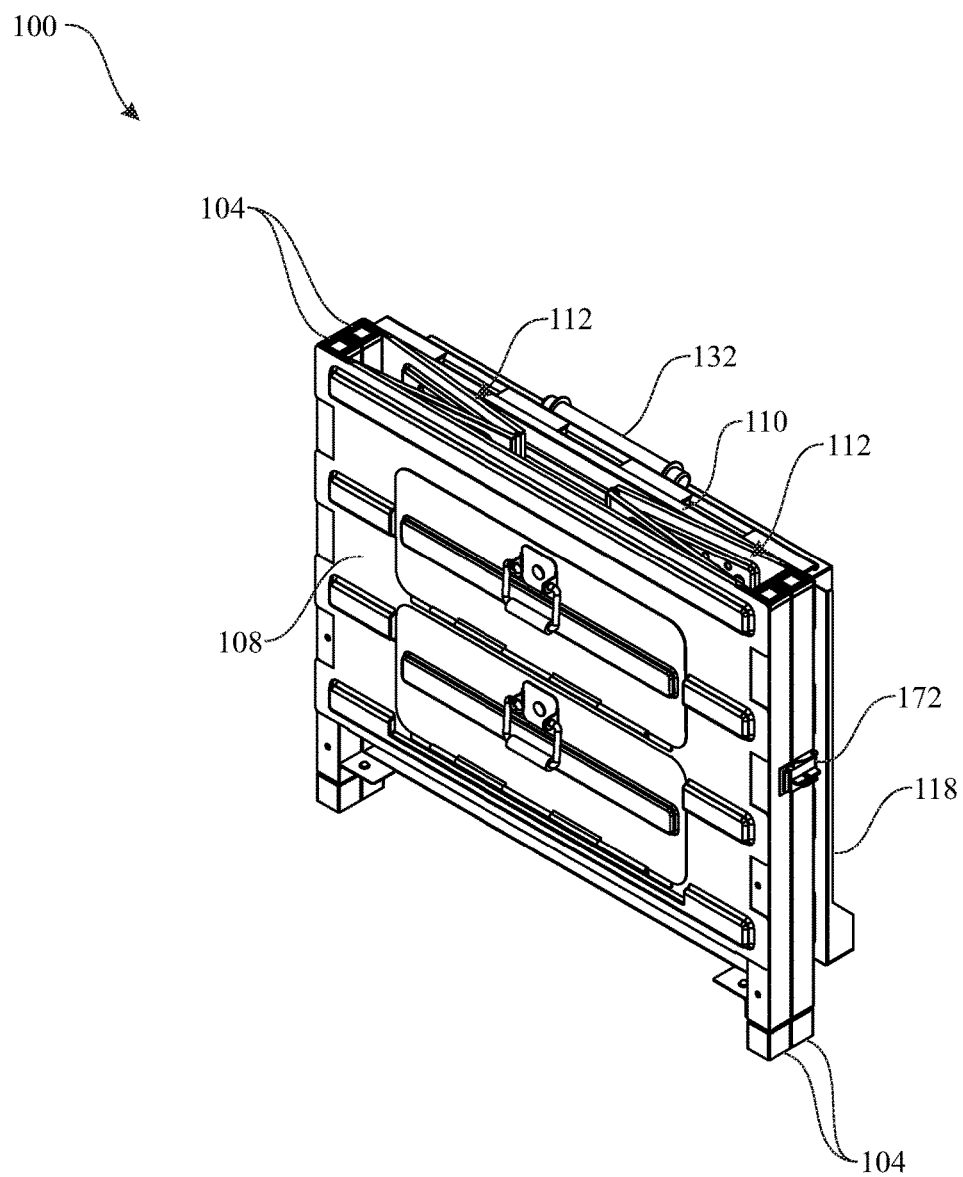
FIG. 8 presents a top front isometric view of the grilling apparatus the completion of converting the apparatus to the compacted portable configuration.
Figure 9:
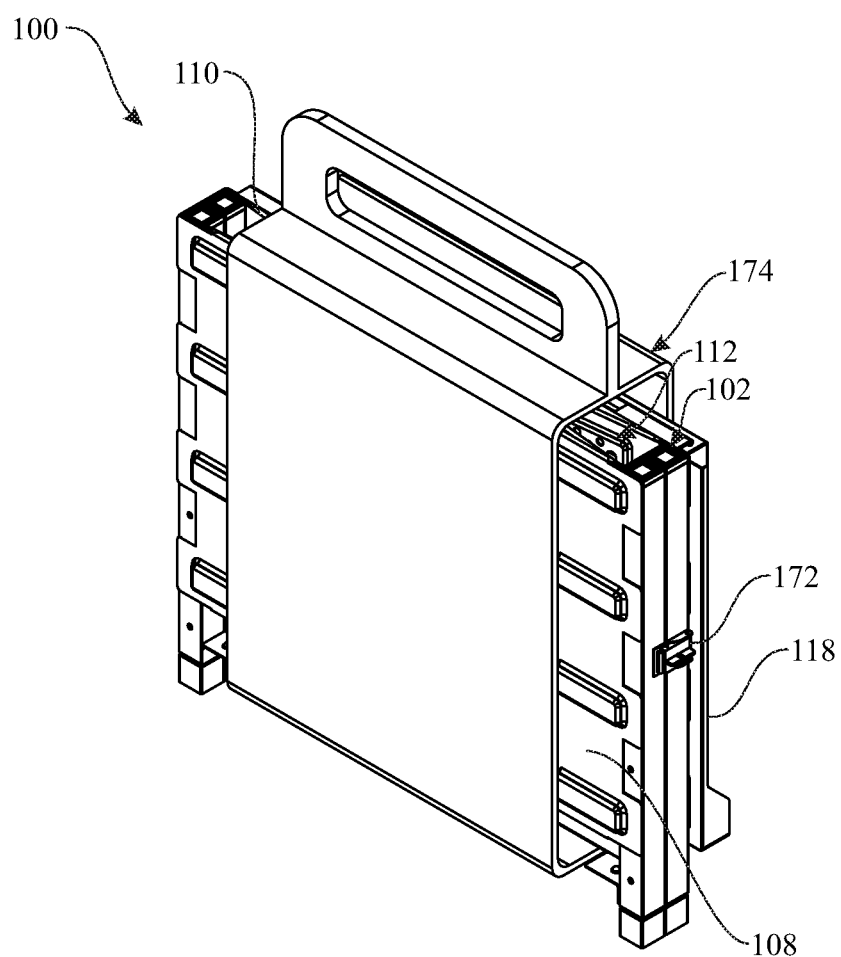
FIG. 9 presents a top front isometric view of the grilling apparatus in the compacted portable configuration and installed within a transport container sleeve that enables transport of the grilling apparatus by a user.

Referring now to FIGS. 1-6, there is illustrated a foldable and portable grilling apparatus, generally designated 100, in accordance with aspects of the present invention. The grilling apparatus 100 includes a body 102 and a plurality of upright corner leg members 104 which together support the body 102 upon and spaced above a support surface S. The body 102 is convertible between an erected operational configuration, as seen in FIGS. 1 and 3-6, and a compacted portable configuration, as seen in FIGS. 7-9. The body 102 forms a grilling chamber 106 only when the body 102 is in the erected operational configuration.

More particularly, the body 102 includes opposite front and back walls 108, 110 and a pair of opposite side walls 112 disposed between the opposite front and back walls 108, 110. The upright corner leg members 104 are disposed adjacent to the outside of respective opposite end portions of the opposite side walls 112 and adjacent to the inside of the front and back walls 108, 110 where the upright corner leg members 104 are attached to spaced apart opposite end segments 108a, 110a forming the respective opposite ends of the front and back walls 108, 110. Each of the opposite side walls 112 is formed by a pair of panels 114. The panels 114 of each respective pair at adjacent or inner end portions thereof are pivotally attached to each other by inner hinged connections 115. Also, the panels 114 of each respective pair thereof at remote or outer end portions thereof are pivotally attached to the front and back walls 108, 110 at portions thereof extending between their opposite end segments 108a, 110a by outer hinged connections 116, which are located adjacent to the upright corner leg members 104. The respective hinged connections 115, 116 enable the panels 114 of each respective pair thereof to be converted between an aligned or unfolded relationship and a folded relationship and thereby the grilling chamber 106 to be converted between the erected operational configuration and the compacted portable configurations, as will be described in detail later on hereinafter. The respective hinged connections 115, 116, by way of example but not limitation, may be in the form of piano hinges.

Figure 1:
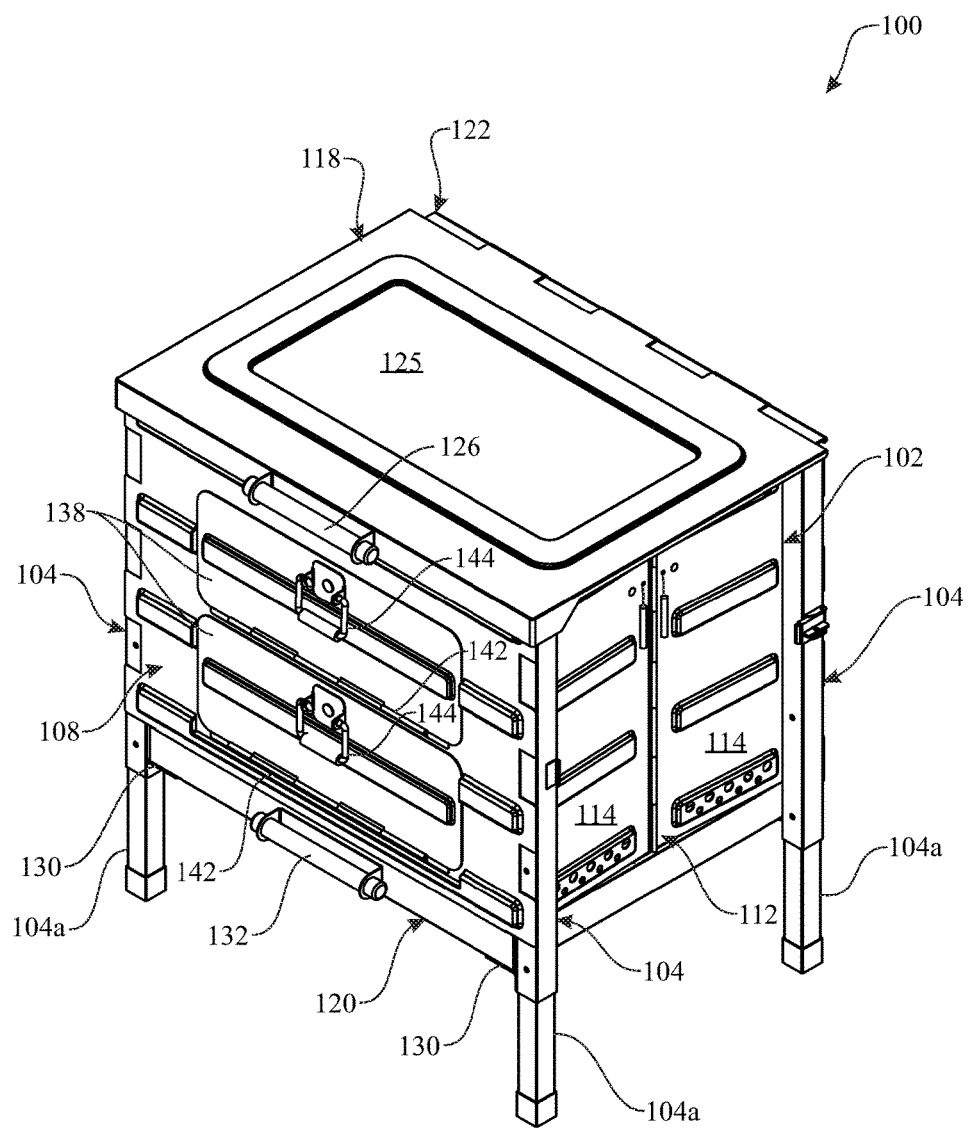
FIG. 1 presents a top front, assembled isometric view of an exemplary embodiment of a foldable and portable grilling apparatus in accordance with aspects of the present invention.
Figure 3:
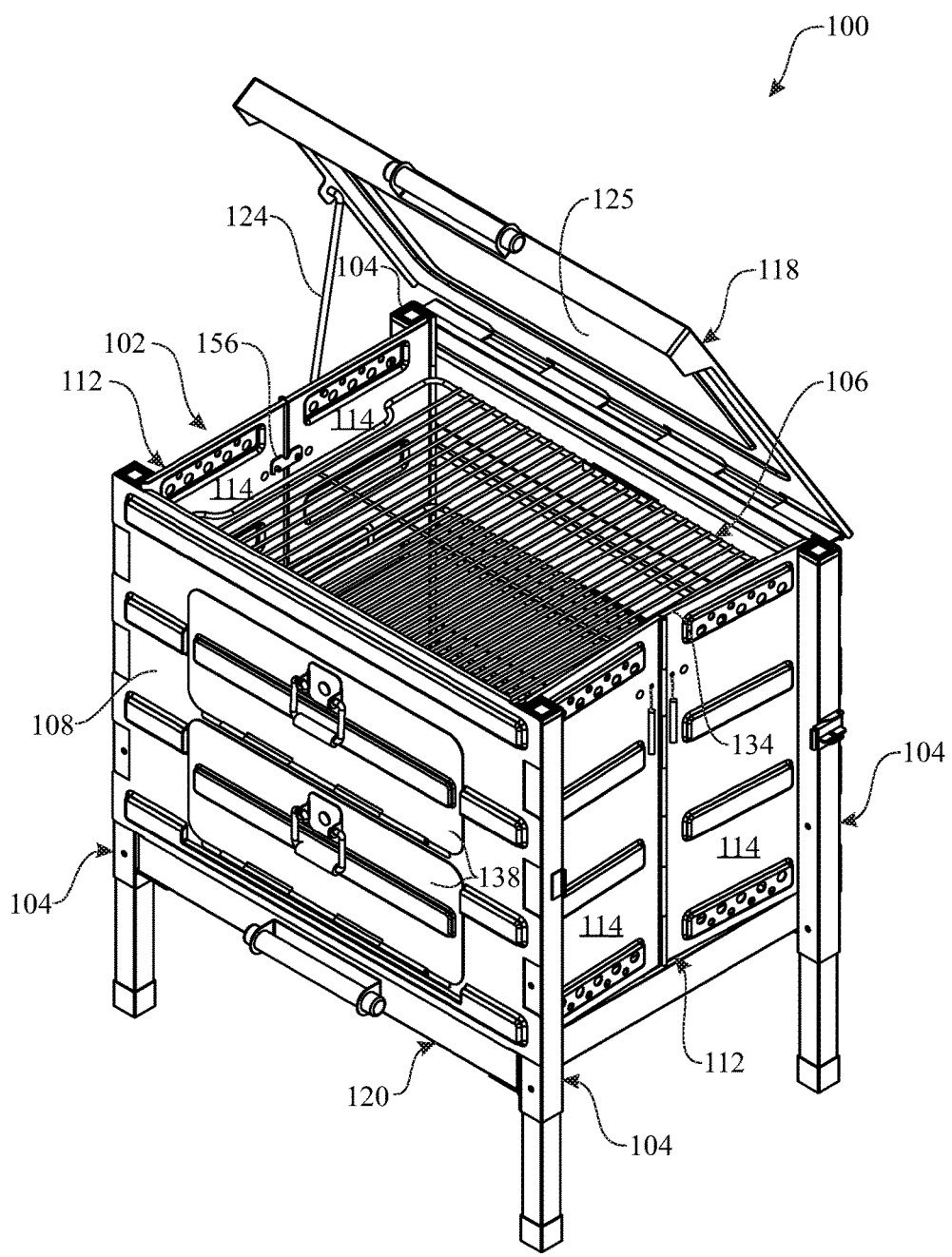
FIG. 3 presents a top front, assembled isometric view of the grilling apparatus originally introduced in FIG. 1, illustrating a lid of the apparatus supported in a partially open position with a pair of upper and lower grilling grates supported in a grilling chamber of the apparatus.
Figure 4:
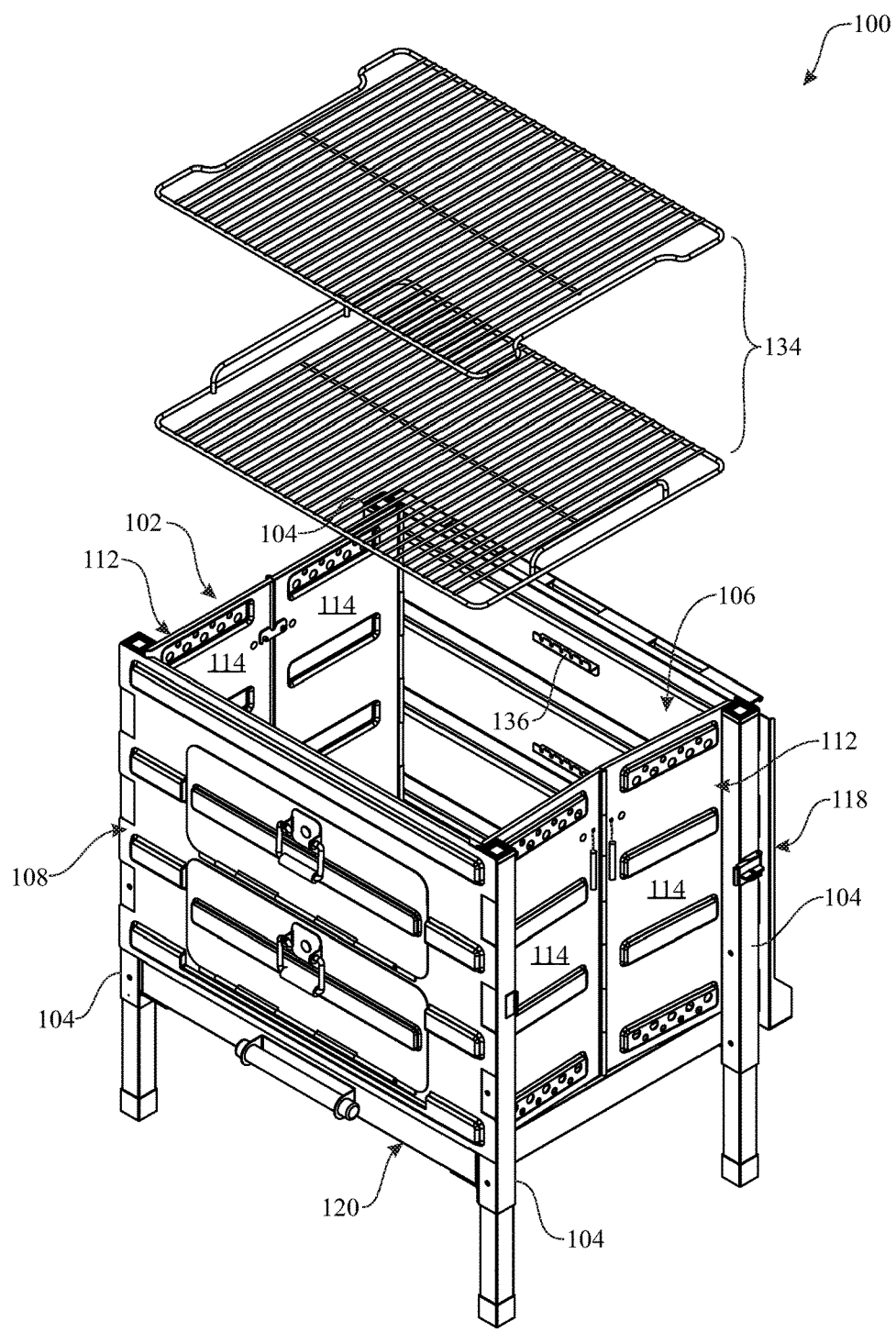
FIG. 4 presents a top front isometric view of the grilling apparatus originally introduced in FIG. 1, illustrating the lid in a fully open position with the upper and lower grilling grates removed from the grilling chamber of the apparatus.

The grilling chamber 106 of the body 102 is open at the top 106a and bottom 106b. The grilling apparatus 100 also includes a top lid 118 and a bottom tray 120 for covering the open top 106a and open bottom 106b of the grilling chamber 106. The top lid 118 of the grilling apparatus 100 is pivotally connected at a rear edge portion to an upper edge portion 110b of the back wall 110 of the body 102 by a hinged connection 122 which, as an example but not limitation, may take the form of a piano hinge. The top lid 118 is thereby enabled to be swung between a closed position, as seen in FIG. 1, in which the top lid 118 overlies and closes the open top 106a of the grilling chamber 106, and an opened position, as seen in FIGS. 4-6, in which the top lid 118 hangs adjacent to an exterior side of the back wall 110 of the body 102. The top lid 118 may also be disposed in a partially open position, as seen in FIG. 3, in which the top lid 118 is supported at an inclined orientation to the open top 106a of the grilling chamber 106 by an elongated positioning bar or rod 124. The top lid 118 has a window 125 and also a front handle 126 attached thereto for use in pivotally moving the top lid 118 between its closed and opened positions relative to the grilling chamber 106 of the body 102.

Figure 2:
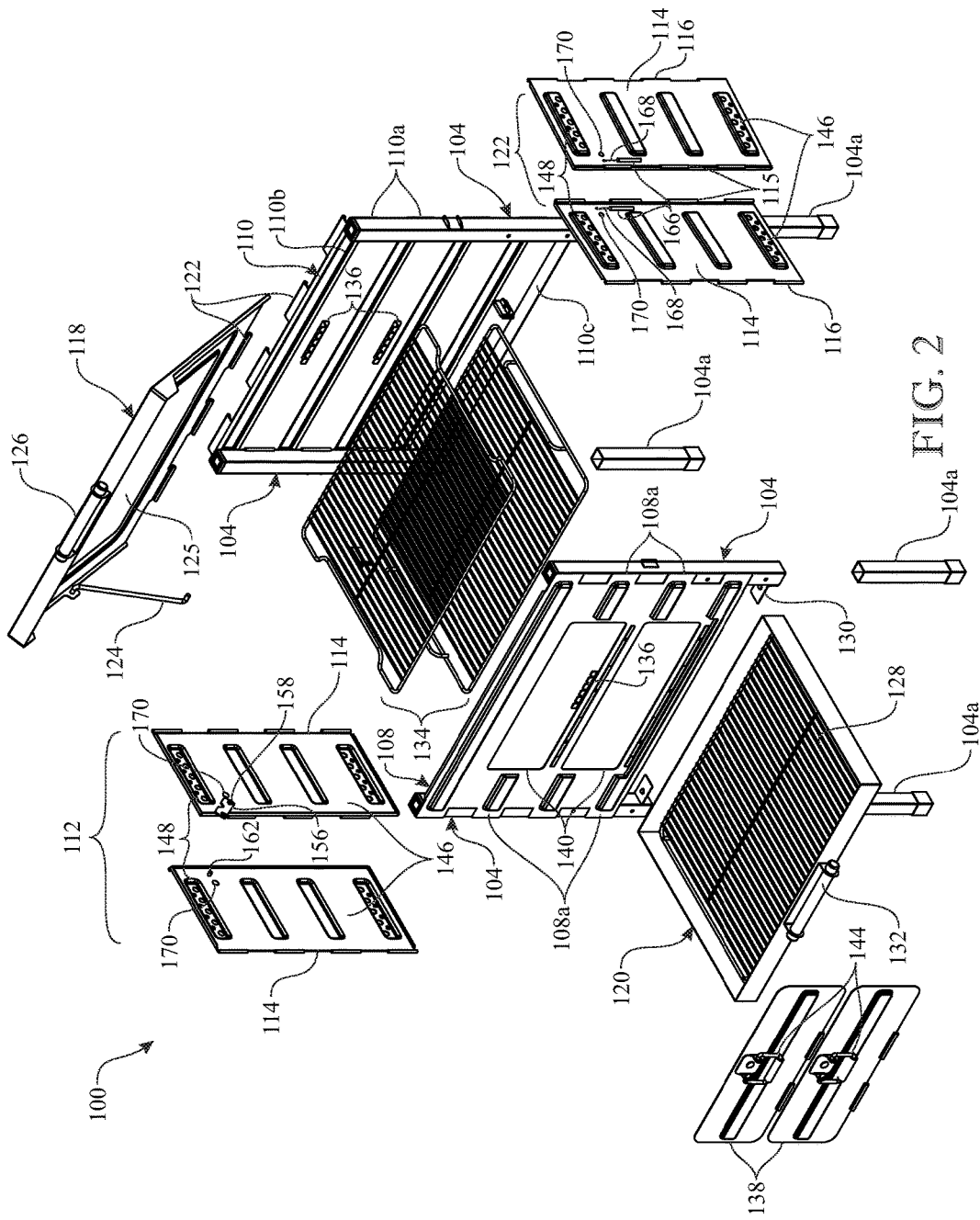
FIG. 2 presents a top front, exploded isometric view of the grilling apparatus originally introduced in FIG. 1.

The bottom tray 120 of the grilling apparatus 100 is adapted for receiving a grate 128 therein, as best shown in FIGS. 2 and 6, for holding fuel, such as in the form of charcoal briquettes thereon, that are combusted to provide the cooking heat in the grilling chamber 106 and also for collection of ashes below the fuel-holding grate 128 from the combustion of the fuel. The bottom tray 120 when in a closed position, as seen in FIGS. 1 and 3-5, is supported at its rear end by an inwardly protruding lower edge portion 110c (see FIG. 2) of the back wall 110 and opposed portions of its front end by a pair of angled front guides 130 on oppositely facing portions of the upright corner leg members 104. By manipulating fasteners, such as eye bolts, (not shown) on the lower exterior of the back wall 110 of the body 102, the bottom tray 120 may be unlocked in preparation for removal or locked to prevent inadvertent removal from the body 102. This support arrangement enables the bottom tray 120, when unlocked, to be moved from the closed position in which the bottom tray underlies (and thereby closes) the open bottom 106b of the grilling chamber 106, as seen in FIGS. 1 and 3-5, toward an opened position in which the bottom tray 120 is displaced away from under the open bottom 106b of the grilling chamber 106, as seen in FIG. 6. The bottom tray 120 has a front handle 132 attached thereto for use in slidably moving the bottom tray to and from its closed position underlying the open bottom 106b of the grilling chamber 106.

Additionally, the grilling apparatus 100 includes at least one and, preferably, a pair of grilling grates 134 disposed in the grilling chamber 106, with one being spaced above the other. Both grilling grates 134 extend between, and at their opposite ends are supported upon, upper and lower pairs of opposing ledges 136 affixed on the respective inner sides of the front and back walls 108, 110. Furthermore, to gain access to upper and lower areas of the grilling chamber 106, proximate the locations of the upper and lower grilling grates 134 and the fuel-holding grate 128 in the bottom tray 120, the grilling apparatus 100 also includes upper and lower doors 138 extending across upper and lower openings 140 defined in the front wall 108 of the body 102. The upper and lower doors 138 are disposed on the outer side of the front wall 108 and pivotally mounted thereto by respective hinged connections 142 affixed along the respective bottom edges of the upper and lower doors and also along the front wall 108 adjacent the bottom edges of the upper and lower openings 140. The respective hinged connections 142, by way of example but not limitation, may be in the form of piano hinges. The upper and lower doors 138 also have pull handles/locks 144 mounted thereon which allow a user to either open or lock the doors.

Further, the grilling apparatus 100 includes respective pluralities of intake and exhaust apertures 146, 148 correspondingly defined along and through lower and upper end portions of each of the panels 114 of the pairs thereof forming the respective opposite side walls 112. The intake apertures 146 enable entry of air, supporting combustion of the fuel, from the exterior of the body 102 into the grilling chamber 106. The exhaust apertures 148 enable venting of gaseous products of combustion from the grilling chamber 106.

Referring now to FIG. 6, the grilling apparatus 100 is shown with a sandwich grate assembly 150, which may be used as an alternate to the pair of grilling grates 134, being aligned with its mounting position in the grilling chamber 106 for holding a meat product, such as a whole pig body (not shown), for roasting in the grilling chamber of the grilling apparatus. The sandwich grate assembly 150 is formed by a pair of grates 152 being fastened together so as to hold the meat product to be grilled in the grilling chamber 106 in a sandwiched manner. The grate assembly 150 has a pair of protrusions in the form of stub shafts 154 affixed to and projecting in opposite directions beyond a pair of opposite sides of the grate assembly 150.

For mounting the grate assembly 150 in the grilling chamber 106 of the grilling apparatus 100, the upper and lower pairs of opposing ledges 136 affixed on the respective inner sides of the front and back walls 108, 110 are not utilized; instead, a pair of elongated lock bars 156 is provided each associated with one of the opposite side walls 112 for supporting the grate assembly 150 via its pair of stub shafts 154. More particularly, each lock bar 156 at one end portion is pivotally mounted by a fastener 158 inserted through a respective one panel 114 of the pair thereof forming a respective one of the opposite side walls 112. Also, each lock bar 156 at an opposite end portion has a downwardly opened notch 160 formed therein. Each of the lock bars 156 may be placed in a locked position that prevents the panels 114 of each side wall 112 from being folded inwardly. By pivotally moving each of the lock bars 156 downwardly through an arcuate path, its opposite end portion with the notch 160 receives and interlocks with a locking head, 162 inserted through a respective other panel 114 of the pair thereof, thereby locking the pair of panels 114 in alignment (or unfolded) with respect to one another in a common plane so as to form a respective one of the opposite side walls 112. In its locked position, the lock bar 156 extends across or overlaps with the inner hinged connection 115 of the respective pair of panels 114 of their respective one of the opposite side walls 112 so as to prevent the panels 114 from being folded inwardly. Thus, the lock bars 156 in their locked positions retain the panels 114 of the side walls 112 in their aligned, unfolded relationships and thus the body 102 and its grilling chamber 104 at the erected operational configuration. Furthermore, the lock bars 156 midway between their opposite end portions and along a top edge thereof have a recess 164 of a profile that matches the cross-sectional profile of each of the stub shafts 154 on the grate assembly 150. Thus, the stub shafts 154 will seat into the recesses 164 of the respective lock bars 156 and thereby rotatably mount the sandwich grate assembly 150 across the grilling chamber 106. The grate assembly 150 is able to rotate through 360°, such as between upright and inverted positions in the grilling chamber 106. Also, a pair of pins 166 supported by chains 168 on the exteriors of the opposite side walls 112 are insertable through respective apertures 170 in the pairs of panels 114 of the respective opposite side walls so as to underlie, support and retain the grate assembly 150 extending horizontally in either the upright or inverted positions in the grilling chamber 106.

Turning now to FIGS. 6-9, there is illustrated the successive stages in converting the grilling apparatus 100 from the erected operational configuration to the compacted portable configuration. As shown in FIG. 6, to enable the start of converting the grilling apparatus 100 from its erected operational configuration to its compacted portable configuration, the setup is that the top lid 118 has been pivoted into its the fully open position, any of the grates 134, 150 previously being used have been removed from the grilling chamber 106, the bottom tray 120 is in the process of being removed from its normally closed position under the open bottom of the grilling chamber 106, and the inside lock bars 156 (only one being seen) have been pivoted upwardly so as to unlock them from the locking heads 162 and thereby unlock the pairs of panels 114 of the respective opposite side walls 112. Such unlocking is achieved by the lock bars 156 being reversely moved upwardly through the same arcuate path to displace them from across the inner hinged connections 115 between each of the pairs of panels 114 so as to release the body 102. Each of the pair of panels 114 of a respective one of the opposite side walls 112 may now be converted from their unfolded relationship to their folded relationship about the outer hinged connections 116 relative to the front and back walls 108, 110 and about the inner hinged connections 115 toward one another so that the body 102 may be folded inwardly upon itself and converted to the compacted portable configuration.

As shown in FIG. 7, the bottom tray 120 has been fully removed from the grilling apparatus 100. The opposite side walls 112 have been partially folded inwardly toward one another to start converting the grilling apparatus 100 from the erected operational configuration to the compacted portable configuration. As shown in FIG. 8, the opposite side walls 112 are completely folded inwardly relative to and between front and back walls 108, 110, the bottom tray 120 is positioned outwardly of and alongside the top lid 118 at the exterior of the back wall 110, leg extensions 104a of the upright corner leg members 104 are fully retracted into the corner leg members, and latches 172 on the pairs of front and back opposing leg members 104 are engaged or latched to retain the body 102 in the folded condition and thereby to complete the converting the grilling apparatus 100 to the compacted portable configuration. As shown in FIG. 9, the grilling apparatus 100 in the compacted portable configuration may be installed within a transport container sleeve 174 that enables portable transport of the grilling apparatus by a user.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A foldable and portable grilling apparatus, comprising:
   a body comprising
      a front wall and a back wall, and
      a pair of opposite side walls disposed between the front wall and the back wall, each of said opposite side walls comprising
         a pair of panels,
         inner hinged connections of said panels of each pair to one another at adjacent inner edge portions thereof, and
         outer hinged connections between remote outer edge portions of said panels of each pair and inner sides of opposite edge portions of said front and back walls such that said pairs of said panels of said opposite side walls are convertible between unfolded and folded relationships,
      wherein a grilling chamber being open at a top and bottom is formed by said front and back walls and said pair of opposite side walls only when said panels of said opposite side walls are in said unfolded relationships and said body is thereby in an erected operational configuration;
   a plurality of upright corner leg members each mounted at one of a pair of opposite end portion of a respective one of said front and back walls so as to support said body spaced above a support surface;
   a pair of elongated lock bars each pivotally mounted at an inner side of one of said pair of panels of respective ones of said opposite side walls for movement between locked and unlocked positions in which said lock bar respectively is overlapped with one of said inner hinged connections between each of said pair of panels so as to retain said panels in said unfolded relationship and is displaced from one of said inner hinged connections between each of said pair of panels so as to enable converting said panels to said folded relationship and thereby said body to a compacted portable configuration;
   a grate assembly adapted to hold an object to be grilled in said grilling chamber, said grate assembly having a pair of opposite protrusions projecting in opposite directions beyond opposite sides of said grate assembly such that said protrusions are removably and rotatably mountable by respective ones of said lock bars when in said locked positions so as to support said grate assembly and enable rotating said grate assembly between upright and inverted positions in said grilling chamber;
   a top lid movable between a closed position in which said top lid overlies said open top of said grilling chamber and an opened position in which said top lid is disposed away from said open top of said grilling chamber, thereby enabling converting said pair of panels of each of said opposite side walls from said unfolded relationships to said folded relationships and thereby said body to said compacted portable configuration; and
   a tray movably supported by said body so as to enable said tray to be moved between a closed position in which said tray underlies said open bottom of said grilling chamber and an opened position in which said tray is removed from said open bottom of said grilling chamber, thereby enabling converting said pair of panels of each of said opposite side walls from said unfolded relationships to said folded relationships and thereby said body to said compacted portable configuration.

2. The grilling apparatus of claim 1 further comprising a pair of pins insertable through respective apertures in said pair of panels of at least one of said opposite side walls so as to underlie and retain said grate assembly extending horizontally in either said upright or inverted positions in said grilling chamber.

3. The grilling apparatus of claim 1 further comprising latches mounted on respective pairs of front and back upright corner leg members being operable to retain said body in the compacted portable configuration.

4. The grilling apparatus of claim 1 further comprising intake apertures defined through a lower end portion of each of said panels of said pairs thereof of said opposite side walls for enabling entry of air from exterior of said body into said grilling chamber.

5. The grilling apparatus of claim 1 further comprising exhaust apertures defined through an upper end portion of each of said panels of said pairs thereof of said opposite side walls for venting gaseous products of combustion from said grilling chamber.

6. The grilling apparatus of claim 1 further comprising an upper and a lower door mounted on said front wall of said body and being movable for opening and closing access through upper and lower openings in said front wall to respective upper and lower areas in said grilling chamber of said body.

7. The grilling apparatus of claim 1 further comprising ledges on upper and lower inside portions of said front and back walls adapted to removably support upper and lower grilling grates in said grilling chamber of said body.

8. A foldable and portable grilling apparatus, comprising:
   a body comprising
      a front wall and a back wall, and
      a pair of opposite side walls disposed between the front wall and the back wall, each of said opposite side walls comprising
         a pair of panels,
         inner hinged connections of said panels of each pair to one another at adjacent inner edge portions thereof, and
         outer hinged connections between remote outer edge portions of said panels of each pair and inner sides of opposite edge portions of aid front and back walls such that said pairs of said panels of said opposite side walls are convertible between unfolded and folded relationships,
      wherein a grilling chamber being open at a top and bottom is formed by said front and back walls and said pair of opposite side walls only when said panels of said opposite side walls are in said unfolded relationships and said body is thereby in an erected operational configuration;

a plurality of upright corner leg members each mounted at one of a pair of opposite edge portion of a respective one of said front and back walls so as to support said body spaced above a support surface;

a pair of elongated lock bars each pivotally mounted at an inner side of one of said pair of panels of respective ones of said opposite side walls for movement between locked and unlocked positions in which said lock bar respectively is overlapped with one of said inner hinged connections between each of said pair of panels so as to retain said panels in said unfolded relationship and is displaced from one of said inner hinged connections between each of said pair of panels so as to enable converting said panels to said folded relationship and thereby said body to a compacted portable configuration;

a top lid movably connected at a rear edge portion to a top edge portion of said back wall of said body so as to enable said top lid to be swung between a closed position in which said top lid overlies said open top of said grilling chamber and an opened position in which said top lid hangs adjacent to an exterior side of said back wall of said body, thereby enabling converting said pair of panels of each of said opposite side walls from said unfolded relationships to said folded relationships and thereby said body to said compacted portable configuration;

a tray movably supported by said body so as to enable said tray to be moved between a closed position in which said tray underlies said open bottom of said grilling chamber and an opened position in which said tray is removed from said open bottom of said grilling chamber and placed adjacent to top lid at said exterior side of said back wall and attached to said back wall, thereby enabling converting said pair of panels of each of said opposite side walls from said unfolded relationships to said folded relationships and thereby said body to said compacted portable configuration; and latches mounted on respective pairs of front and back upright corner leg members being operable to retain said body in the compacted portable configuration.

9. The grilling apparatus of claim 8 further comprising a transport container sleeve with said body in said compacted portable configuration being installed therein, thereby enabling portable transport thereof.

10. The grilling apparatus of claim 8 further comprising intake apertures defined through a lower end portion of each of said panels of said pairs thereof of said opposite side walls for enabling entry of air from exterior of said body into said grilling chamber.

11. The grilling apparatus of claim 8 further comprising exhaust apertures defined through an upper end portion of each of said panels of said pairs thereof of said opposite side walls for venting gaseous products of combustion from said grilling chamber.

12. The grilling apparatus of claim 8 further comprising an upper and a lower door mounted on said front wall of said body and being movable for opening and closing access through upper and lower openings in said front wall to respective upper and lower areas in said grilling chamber of said body.

13. The grilling apparatus of claim 8 further comprising ledges on upper and lower inside portions of said front and back walls adapted to removably support upper and lower grilling grates in said grilling chamber of said body.

* * * * *